US006352138B1

(12) United States Patent
Duran et al.

(10) Patent No.: US 6,352,138 B1
(45) Date of Patent: Mar. 5, 2002

(54) WHEELCHAIR BRAKING SYSTEM

(76) Inventors: Miguel Duran; Camilo Duran; Ignacio Duran, all of 1718 Deer Path, San Antonio, TX (US) 78232

( * ) Notice: Subject to any disclaimer, the term of this patent is extended or adjusted under 35 U.S.C. 154(b) by 0 days.

(21) Appl. No.: 09/693,108

(22) Filed: Oct. 20, 2000

(51) Int. Cl.[7] .................................................. B60T 1/00
(52) U.S. Cl. ........................ 188/2 F; 188/31; 188/109; 188/167
(58) Field of Search ................................ 188/2 F, 109, 188/31, 69, 265, 17, 18 R, 110, 174, 166, 167; 280/250.1, 304.1

(56) References Cited

U.S. PATENT DOCUMENTS

| 4,623,043 | A | * | 11/1986 | Babilas | 188/2 F |
|---|---|---|---|---|---|
| 4,733,755 | A | * | 3/1988 | Manning | 188/2 F |
| 5,203,433 | A | * | 4/1993 | Dugas | 188/2 F |
| 5,358,266 | A | * | 10/1994 | Roth et al. | 188/2 F |
| 5,379,866 | A | * | 1/1995 | Pearce et al. | 188/31 |
| 5,401,044 | A | * | 3/1995 | Galumbeck | 188/2 F |
| 5,799,756 | A | * | 9/1998 | Roberts et al. | 188/2 F |
| 5,845,746 | A | * | 12/1998 | Henrickson et al. | 188/2 F |
| 5,984,334 | A | * | 11/1999 | Dugas | 188/2 F |
| 6,012,555 | A | * | 1/2000 | Duran et al. | 188/2 F |
| 6,264,007 | B1 | * | 7/2001 | Norton et al. | 188/2 F |

* cited by examiner

*Primary Examiner*—Douglas C. Butler
(74) *Attorney, Agent, or Firm*—Goldstein Law Offices, P.C.

(57) ABSTRACT

A wheelchair braking system, for use on a wheelchair having a frame and a pair of wheels, comprising an outer plate assembly, an inner plate assembly, and an axle assembly attached to one of the wheels. The axle assembly is supported by the outer plate assembly. The axle assembly has a sprocket gear comprising a plurality of sprocket teeth. When weight upon the wheelchair is reduced when a passenger gets up from the wheelchair, an outer plate assembly moves downward with respect to an inner plate assembly, bringing a foremast teeth into contact with a sprocket gear, and braking the wheels. A manual release lever extends rearward from a housing so that a person standing behind the wheelchair can selectively operate the manual release lever to free the foremast from the sprocket gear and allow the wheels to rotate.

9 Claims, 5 Drawing Sheets

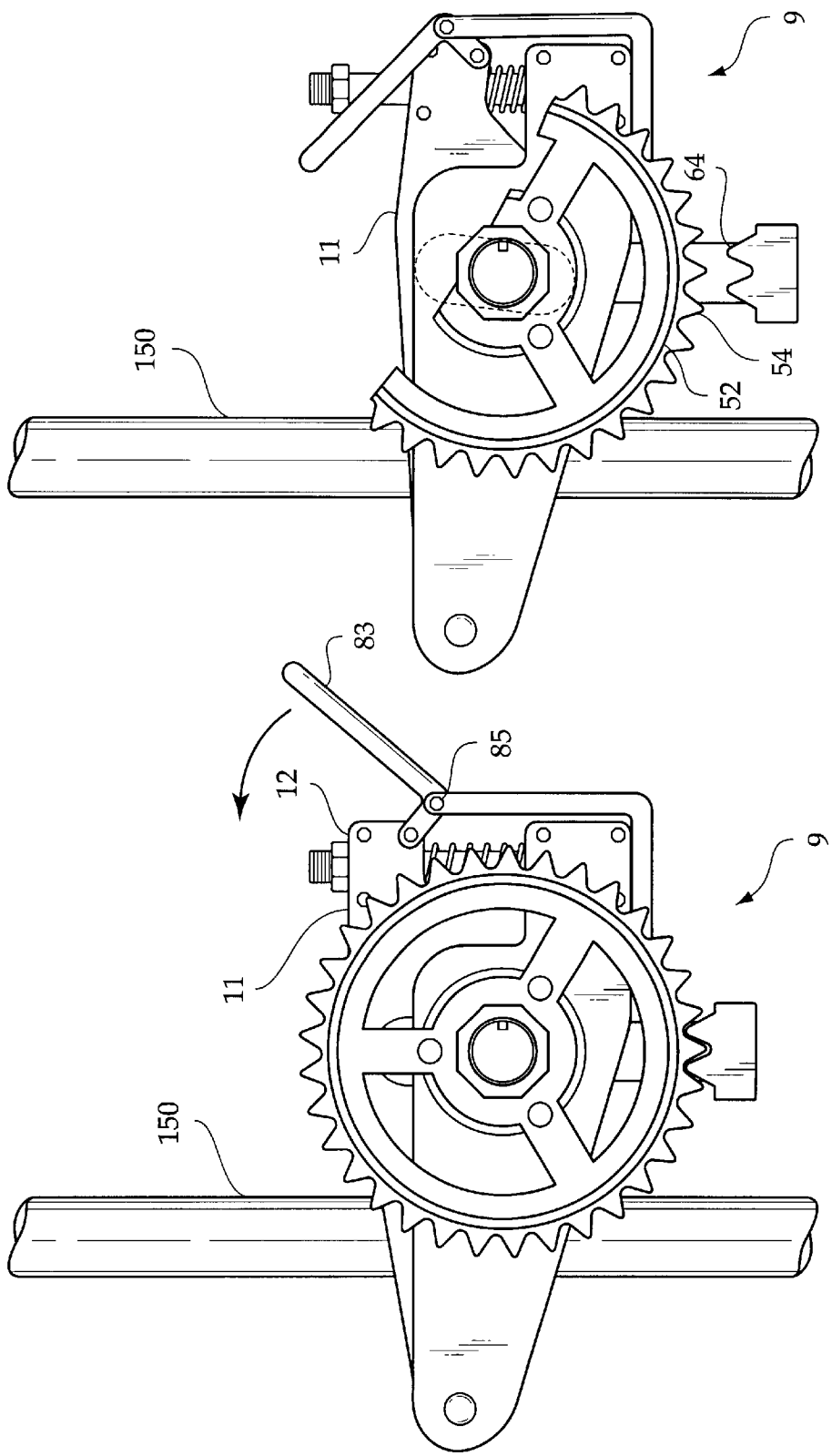

WHEELCHAIR BRAKING SYSTEM

BACKGROUND OF THE INVENTION

The invention relates to a wheelchair braking system. More particularly, the invention relates to a system for automatically preventing the wheels of a wheelchair from moving when the passenger is not fully seated in the wheelchair, thus preventing the wheelchair from moving suddenly while the passenger is in the process of sitting down or getting up from the wheelchair.

Standard wheelchairs have two large wheels which are attached on the sides of the wheelchair. These wheels are typically mounted in a manner which maximizes freedom of movement, to facilitate low effort mobility for the passenger seated in the wheelchair. However, having freely moving wheels is not always advantageous. When the passenger is getting up from the wheelchair, or sitting down, it is highly desirable that the wheelchair provide some degree of "sure footing" for the passenger. The passenger relies on the wheelchair to balance themselves while getting up and sitting down.

Frequently, the wheelchair does not provide the needed balance, but instead rolls backward just as the passenger shifts their weight toward the wheelchair. Thus, the end result is typically a fall. The fall can cause severe injury, especially if the passenger hits their head on the chair on the way down. Often the passenger is using the wheelchair because of an injury. Thus, a fall therefrom can aggravate existing injuries, prevent them from healing correctly, or even cause new injuries.

To prevent such mishaps, some wheelchairs have a manual brake provided. U.S. Pat. No. 5,379,866 to Pearce et al. discloses a light-weight wheel assembly and static brake for wheelchairs. This manual brake allows the passenger to lock the wheels before sitting down or getting up from the wheelchair. However, the manual brake is only effective in preventing injury if the passenger remembers to set it. Further, many people who use wheelchairs suffer from diminished mental capacity. These people often forget to set the brake, and then fall when they try to get up from the wheelchair.

U.S. Pat. No. 5,358,266 to Roth et al. discloses a wheelchair electric brake and pedal safety kit. A wheelchair braking system is disclosed which has an electric switch mounted within the seat for sensing the weight of the passenger, and a brake that is operated thereby. Unfortunately, the device in Roth is electrically operated. Thus, it requires that the user maintain a charged battery power source in order for the brake to continue to operate properly.

U.S. Pat. No. 5,203,433 discloses an automatic braking wheelchair, which employs an arm that is directly linked between the seat and the wheel, for locking the wheel when the passenger rises from the seat. U.S. Pat. Nos. 4,733,755 to Manning and 4,623,043 to Babilas both disclose devices which seek to automatically lock the wheels when the passenger is exiting the wheelchair.

U.S. Pat. No. 6,012,555 to Duran et al. discloses a wheelchair braking system which automatically locks as the a person seated in the wheelchair starts to get up from the wheelchair, and which has a release lever which is operable by a helper standing behind the chair.

While these units may be suitable for the particular purpose employed, or for general use, they would not be as suitable for the purposes of the present invention as disclosed hereafter.

SUMMARY OF THE INVENTION

It is an object of the invention to produce a wheelchair braking system which automatically locks one or more wheels of a wheelchair, to prevent the wheelchair from rolling when a passenger is sitting down or getting up from the wheelchair. Accordingly a braking mechanism is provided which responds to weight upon the wheelchair from the passenger, and will lock the wheel attached thereto when the relative weight upon the wheelchair seat indicates that the passenger is not fully seated.

It is another object of the invention to produce a wheelchair braking system which adapts onto any standard wheelchair. Accordingly a system is provided which is easily attachable by simply removing the wheels mounting the braking system to the frame and reattaching the wheels.

It is yet another object of the invention to provide a wheelchair braking system which is constructed for reliability, and requires only minimal maintenance. Accordingly, a fully mechanical system is provided which does not require batteries or any other source of electrical power to operate.

It is a further object of the invention to provide a wheelchair braking system which engages to stop movement of the wheels, and then leaves very little "play" within the wheels, so that once the locking system is engaged the wheels are only capable of moving a few inches forward or backward. Accordingly, braking is accomplished by engaging a foremast with the teeth of a sprocket gear. Depending on the number of teeth in the sprocket gear, play can be easily minimized to approximately ten degrees.

It is a still further object of the invention that the brake can be manually disengaged by a person helping the passenger. Accordingly, a manual release lever is provided, which extends rearward from the braking housing, so that a helper standing behind the wheelchair can easily release the brake when they are holding the chair for a person sitting down or getting up from the wheelchair.

The invention is a wheelchair braking system, for use on a wheelchair having a frame and a pair of wheels, comprising an outer plate assembly, an inner plate assembly, and an axle assembly attached to one of the wheels. The axle assembly is supported by the outer plate assembly. The axle assembly has a sprocket gear comprising a plurality of sprocket teeth. The outer plate assembly is pivotally mounted to the inner plate assembly and is capable of controlled vertical motion with respect thereto. A spring is located between the inner plate assembly and outer plate assembly, such that weight upon the wheelchair compresses the spring and allows the outer plate assembly to move upward with respect to the inner plate assembly. A foremast assembly having a foremast block is mounted to the inner plate assembly such that when the outer plate assembly is lowered sufficiently with respect to the inner plate assembly, foremast teeth thereof engage the sprocket teeth and stop the sprocket gear from rotating. Thus, when weight upon the wheelchair is reduced when a passenger gets up from the wheelchair, the outer plate assembly moves downward with respect to the inner plate assembly, bringing the foremast teeth into contact with the sprocket gear, and braking the wheels. A manual release lever extends rearward from the housing so that a person standing behind the wheelchair can selectively operate the manual release lever to free the foremast from the sprocket gear and allow the wheels to rotate.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 6 is a side elevational view, illustrating the braking system in a first position, wherein the foremast is engaged with the sprocket, preventing the axle from rotating, and thus locking the wheel attached thereto.

FIG. 7 is a side elevational view, similar to FIG. 6, except where the manual release lever has been used to move the inner plates with respect to the outer plates to separate the sprocket and foremast, unlock the braking system, and allow the wheel to rotate.

DETAILED DESCRIPTION OF THE PREFERRED EMBODIMENTS

Figure 1:
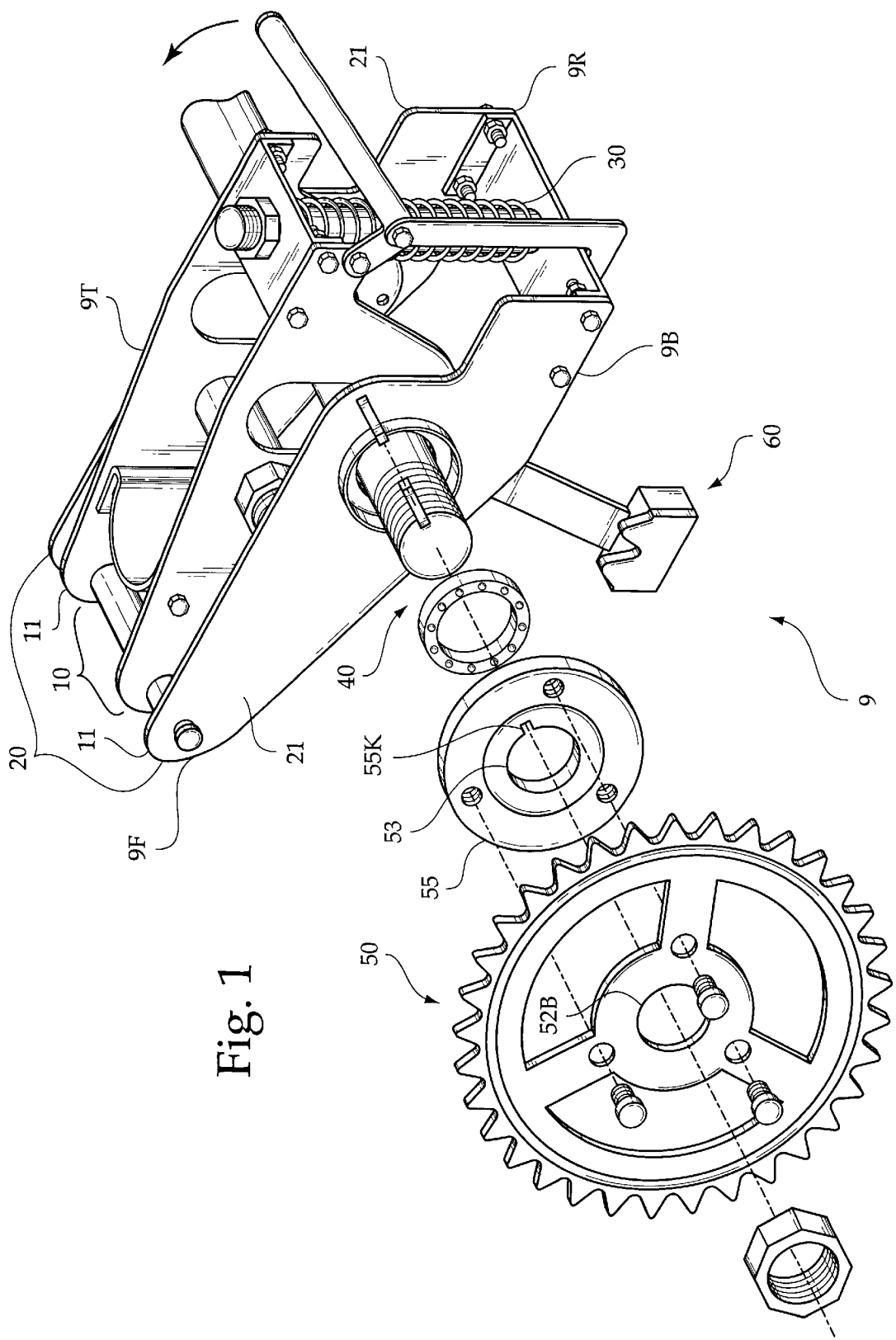
FIG. 1 is a diagrammatic exploded view, illustrating various components of the wheelchair braking system.

FIG. 1 illustrates a braking system 9, having a front 9F, a rear 9R, a top 9T, and a bottom 9B, comprising an inner plate assembly 10 and an outer plate assembly 20. The inner plate assembly 10 comprises a pair of inner plates 11, which are rigidly attached to each other. The outer plate assembly 20 comprises a pair of outer plates 21, which are rigidly attached to each other.

The inner plate assembly 10 is hingeably attached to the outer plate assembly 20 at the front 9F, and are connected by a spring assembly 30 at the rear 9R. The spring assembly 30 biases the inner plate assembly 10 vertically away from the outer plate assembly 20 at the rear 9R. It is relative angular movement at the front 9F or corresponding vertical movement at the rear 9R of the inner plate assembly 10 and outer plate assembly 20 which causes the braking system 9 to selectively enter a locked position as seen in FIG. 6, or an unlocked position as seen in FIG. 7.

Also illustrated in FIG. 1 is an axle assembly 40, a sprocket assembly 50, and a foremast assembly 60. In general terms, the axle assembly 40 is linked to a wheel of the wheelchair so that said wheel can rotate only when said axle assembly 40 is allowed to rotate. Further, the sprocket assembly 50 is similarly linked to the axle assembly 40 so that the axle assembly 40 can only rotate when the sprocket assembly 50 is allowed to rotate. Still further, the foremast assembly 60 selectively engages the sprocket assembly 50 according to relative positioning of the inner plate assembly 10 and outer plate assembly 20. Thus, the wheelchair wheel can only rotate when the foremast assembly 60 is not engaged with the sprocket assembly 50. The remaining discussion therefore details the various components of the braking system, and interaction therebetween which cause the foremast assembly 60 to selectively engage the sprocket assembly 50, and thus selectively brake the wheelchair wheels.

Figure 2:
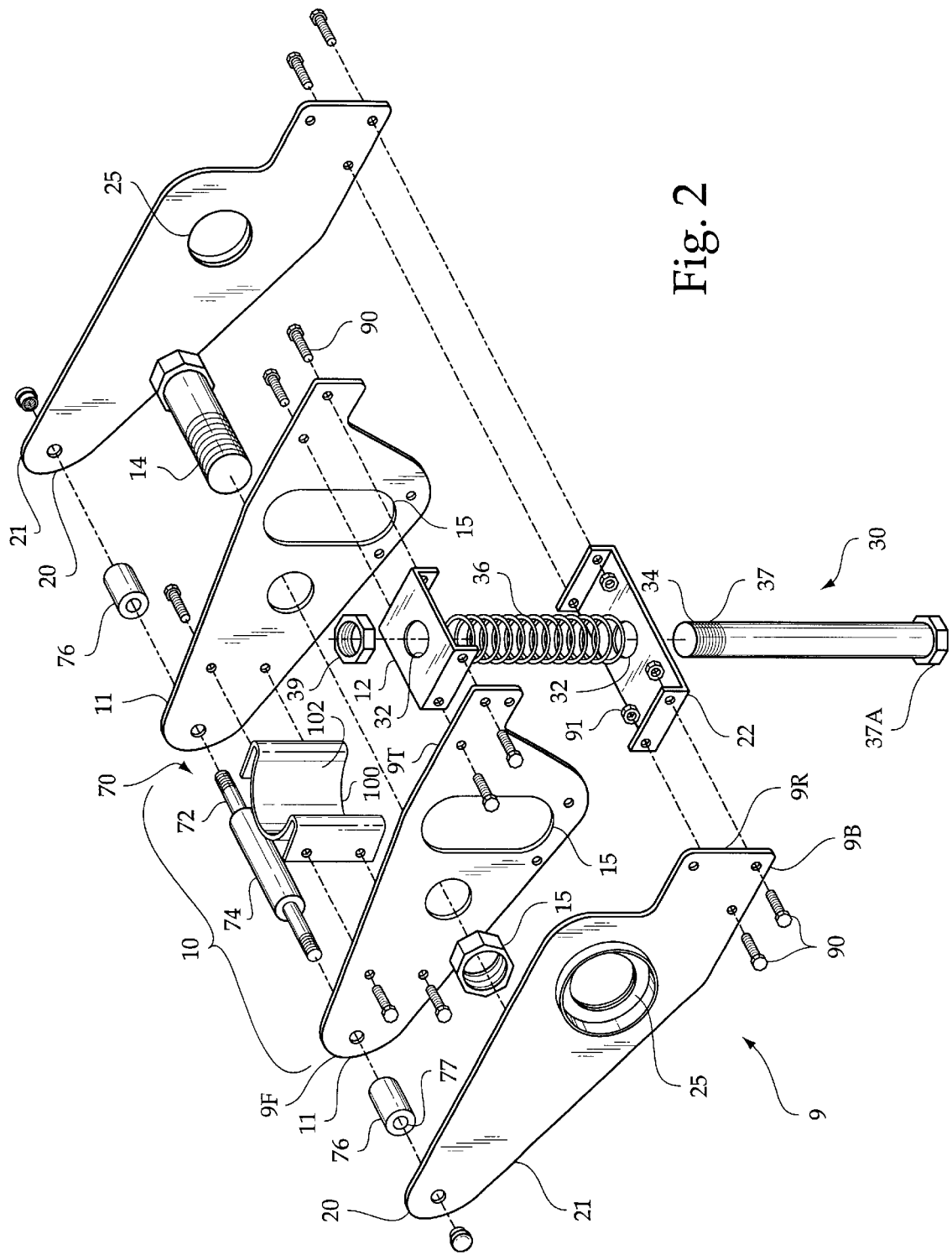
FIG. 2 is an exploded view, illustrating components of the inner plate assembly, outer plate assembly, and interconnection thereof.

FIG. 2 is an exploded view which details components which make up the inner plate assembly 10, outer plate assembly 20, and spring assembly 30.

In particular, the inner plate assembly 10 is allowed to pivot with respect to the outer plate assembly 20 by a pivot assembly 70. The pivot assembly 70 includes a main shaft 72, and a central collar 74 disposed thereon. The central collar 74 is a coaxial enlargement of the main shaft 72 which serves to space the inner plates 11 from each other at the front 9F. In addition, a pair of outer spacers 76 are located between each of the inner plates 11 and the nearest outer plate 21 thereto. The outer spacers 76 each have an outer spacer bore 77 extending coaxially therethrough. The main shaft 72 extends through the outer spacer bore 77 of each outer spacer 76, and extends beyond said outer spacers 76, through each of the outer plates 21. A pair of caps 78 attaches onto the main shaft 72 outward of each of the outer plates 21. Accordingly, the inner plates 11 together can freely pivot with respect to the outer plates 21 at the pivot assembly 20. However, distances between all of the plates is carefully maintained at said pivot assembly 70 by a combination of the central collar 74 and outer spacers 76 thereof.

In addition, the inner plates 11 are rigidly attached together near the top 9T near the rear 9R with an inner plate bridge 12. The rigid fastening of the inner plate bridge 12 to the inner plates 11 is accomplished with assembly bolts 90 and assembly nuts 91. Similar components and fastening schemes are used to rigidly attach other components of the braking system 9. Accordingly, they are shown at certain places in the drawings for the purpose of clearly showing points at which adjacent components of the braking system 9 are rigidly attached as opposed to merely being adjacent to each other. However, such fastening schemes and components are well known to those of skill in the art, and as such requires little discussion herein.

The outer plates 21 are rigidly attached near the rear 9R near the bottom 9B with an outer plate bridge 22. Both the inner plate bridge 12 and outer plate bridge 22 have a spring guide bore 32 extending vertically therethrough. The spring guide bores 32 are concentric and substantially equal in size.

The spring assembly 30 includes a cylindrical spring guide 34 and a helical spring 36 extending therearound. The spring guide 34 extends through both spring guide bores 32, and the helical spring 36 extends around the spring guide 34 between both the outer plate bridge 22 and inner plate bridge 12.

The helical spring 36 is tensioned between the outer plate bridge 22 and inner plate bridge 12, and thus resists motion of the outer plate bridge 22 toward the inner plate bridge 12. Since the inner plate bridge 12 and outer plate bridge 22 must move toward each other to unlock the braking system 9, properties of the helical spring 36 help determine how much weight must be exerted upon the wheelchair to unlock the braking system 9, and how sensitive the braking system 9 is to the person seated in the wheelchair beginning to stand up.

The tendency of the inner plate bridge 12 and outer plate bridge 22 to move away from each other under the tension of the helical spring 36 is limited by the spring guide 34. Accordingly, in the embodiment shown, the spring guide 34 is formed by a spring guide bolt 37, having a spring guide bolt head 37A, and a spring guide nut 39. The spring guide bolt head 37A and spring guide nut 39 each rest against one of the inner plate bridge 12 and outer plate bridge 22. Accordingly, travel of the inner plate bridge 12 away from the outer plate bridge 22 is limited by the spring guide nut 39 and the spring guide bolt head 37A.

Additional rigidity of the inner plate assembly 11 may be provided by a middle bolt 14 and middle nut 15. The middle bolt 14 extends between the inner plates 11 substantially midway between the front 9F and rear 9R, and substantially midway between the top 9T and bottom 9B. When fastened with the middle nut 15, the middle bolt 14 provides a rigid attachment between the inner plates 12, and contributes significant structural integrity thereto.

A vertical mounting collar 100 is rigidly attached between the inner plates 11. The vertical mounting collar 100 has a channel 102 which allows a vertical structural member from the wheel chair to extend therein. Further, the vertical mounting collar 100 has provisions for rigidly securing said vertical structural member within said channel 102, so that said vertical structural member can cause the inner plate assembly 11 to move therewith.

Finally, shown in FIG. 2 are outer plate shaftways 25 and inner plate shaftways 15 which allow the axle assembly to extend across and through both the outer plate assembly 21 and inner plate assembly 11. The outer plate shaftways 25 comprise circular bores through the outer plates 22. The inner plate shaftways 15 comprise oval or oblong bores which allow the axle assembly to extend therethrough, uninhibited despite relative movement of the inner plate assembly 11 with respect thereto. The size of each oval or oblong bore of the inner plate shaftways 15 is configured to accommodate the full range of motion of the inner plate assembly 11 with respect to the outer plate assembly 21, as allowed by the spring assembly 30.

Figure 4:
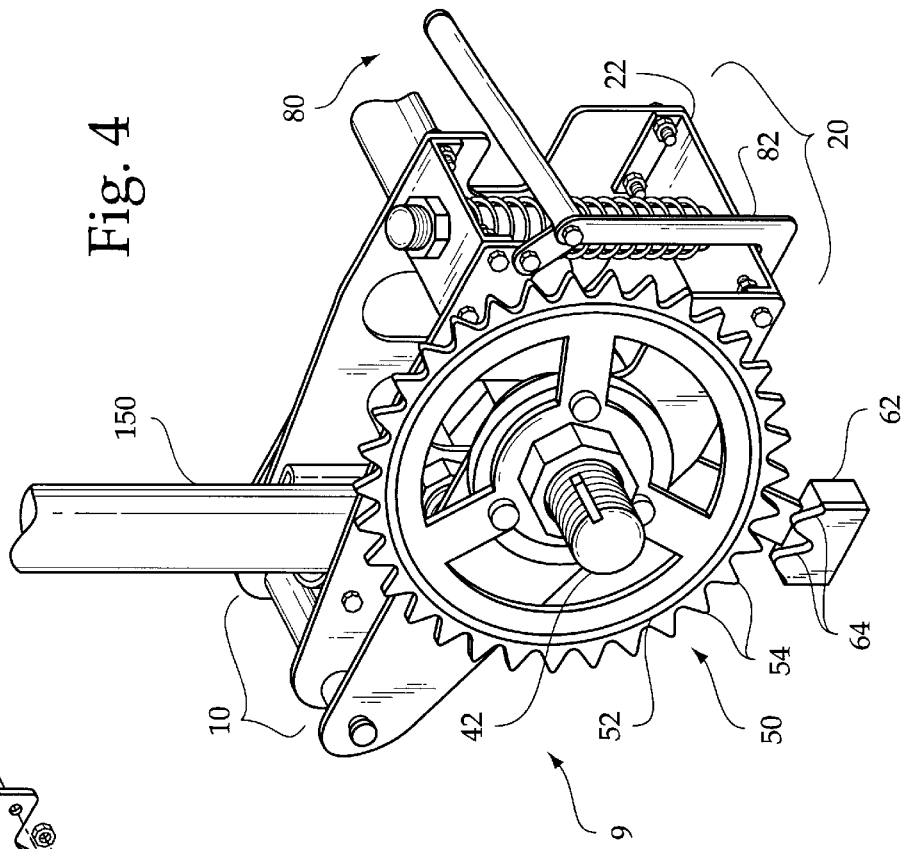
FIG. 4 is a diagrammatic perspective view, illustrating the invention fully assembly, and mounted between a vertical member of the wheelchair frame and an axle attached to one of the wheelchair wheels.
Figure 3:
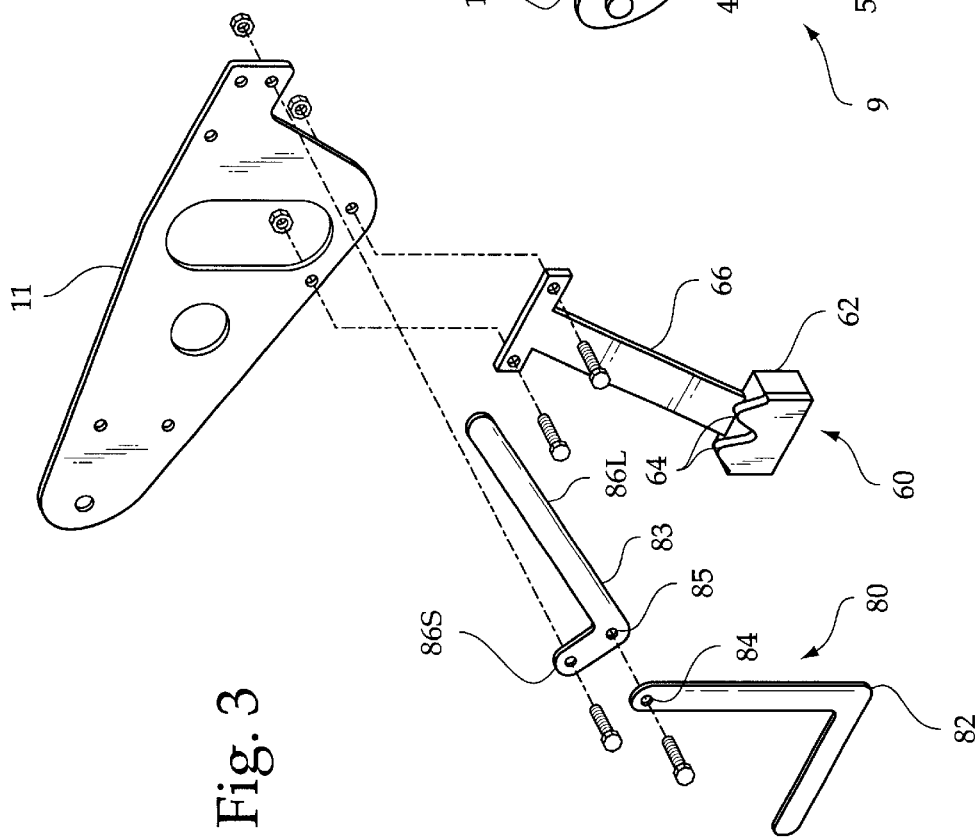
FIG. 3 is an exploded view, illustrating interconnection between one of the inner plates and the foremast assembly and connection of the manual release assembly to said inner plate.

FIG. 3 illustrates the foremast assembly 60, and attachment thereof to one of the inner plates 11. The foremast assembly 60 includes a locking block 62 which includes two or more foremast teeth 64. Referring momentarily to FIG. 4, the sprocket assembly 50 includes a sprocket gear 52 having a plurality of gear teeth 54. Referring back to FIG. 3, the foremast assembly 60 also includes a foremast arm 66, whose purpose is to position the locking block 62 beneath the sprocket gear 52, such that the foremast teeth 64 extend in the same plane as the sprocket teeth 54. Accordingly, referring again to FIG. 4, the foremast arm 66 maintains the foremast teeth 64 in position near the sprocket gear 52 and allows them to selectively engage the sprocket teeth 54 when the braking system 9 is in the locked position by virtue of the relative position of the inner plate assembly 10 and outer plate assembly 20, and causes the foremast teeth 64 to disengage from the sprocket teeth 54 when the braking system 9 is in the unlocked position.

Also illustrated in FIG. 3 and FIG. 4 is a manual release assembly 80, for allowing the braking system 9 to be manually manipulated from the locked position to the unlocked position by a person standing behind the wheelchair who is helping the person seated in the wheelchair. The manual release assembly 80 includes a fixed bracket 82 and a lever 83. The fixed bracket mounts to the outer plate bridge 22 and extends vertically upward therefrom. The fixed bracket 82 has a pivot point 84 fully opposite from the outer plate bridge 22. The lever 83 forms a substantially right angle with a fulcrum 85 at said angle. The lever 83 has a short leg 86S and a long leg 86L. The short leg 86S terminates at a pivot attachment to one of the inner plates 11 near the inner plate bridge 12. The long leg 86L extends rearwardly and upwardly from the fulcrum 85, and from the braking system 9 to a position where it is conveniently operated by a person standing behind the wheelchair. The fulcrum 85 is attached to the pivot point.

Viewing now FIG. 6 and FIG. 7, as the lever 83 is urged forward, the fulcrum 85 translates the forward motion of the lever 83 to a downward motion of the inner plate bridge 12, and consequently a downward motion of the inner plate assembly 11. Accordingly, when the inner plate assembly 11 has been moved downward as shown in FIG. 7, the foremast teeth 64 are freed from the sprocket teeth 54, allowing the sprocket gear 52 to rotate.

Referring back to FIG. 1, the sprocket assembly 50 and axle assembly 40 are detailed, as well as the interconnection between the same. In particular, the sprocket gear 52 has a sprocket gear bore 52B. Further, the sprocket assembly 50 includes a sprocket mounting plate 55 having a sprocket mounting plate bore 55B and a sprocket mounting plate keyway 55K adjacent to the mounting plate bore 55B. The sprocket mounting plate 55 is fastened to the sprocket gear 52, and is concentric with the sprocket gear bore 52B.

Figure 5:
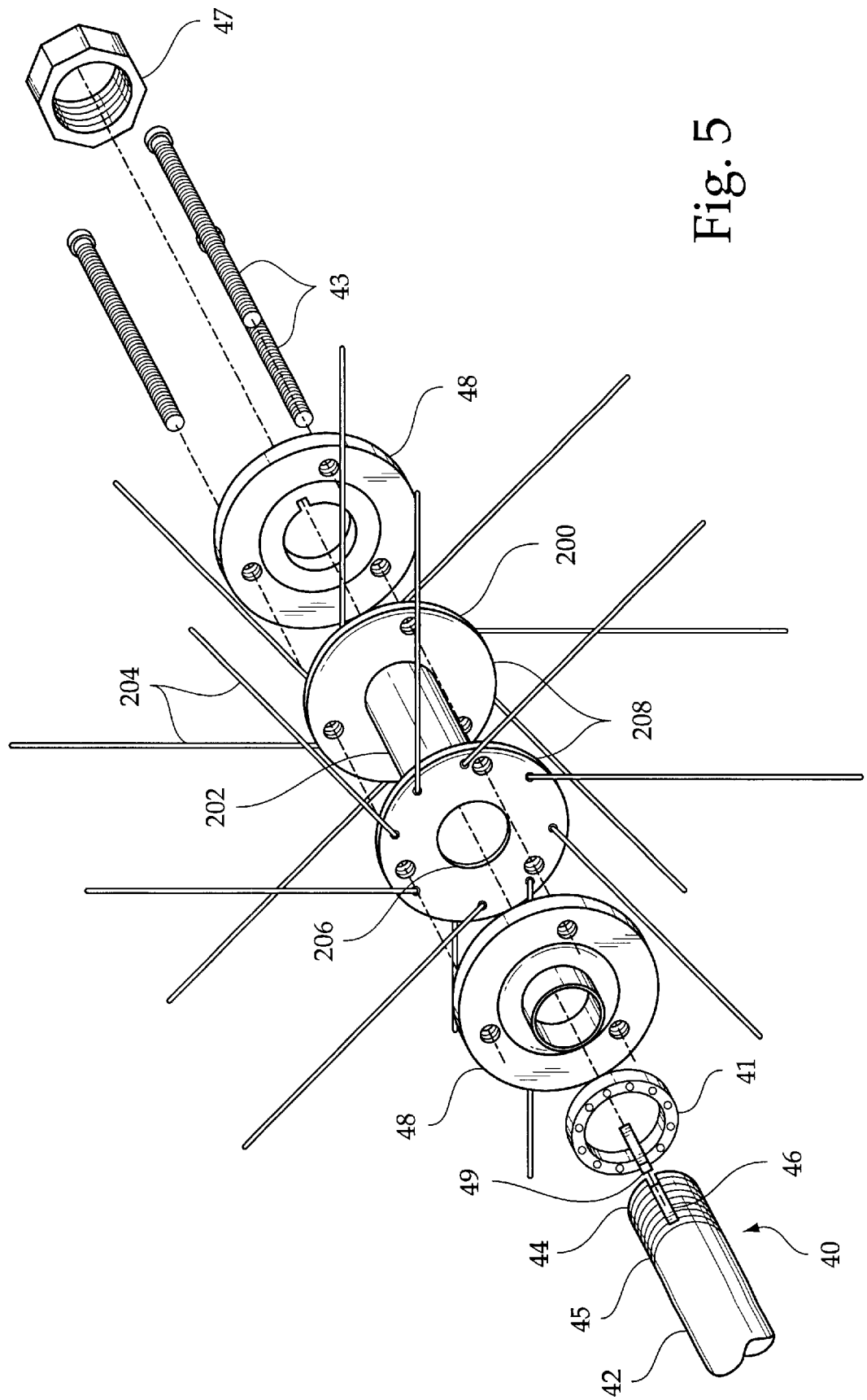
FIG. 5 is an exploded view, illustrating a preferred manner of mounting one of the wheelchair wheels onto the axle.

FIG. 5 illustrates interconnection of the braking system to a wheelchair wheel 200. The wheelchair wheel 200 has a hub 202, and spokes 204. The hub 202 includes a wheel bore 206 extending transversely therethrough, and a pair of flange plates 208.

The axle assembly 40 includes an axle 42 having a wheel end 44. The wheel end 44 has a threaded portion 45 near the wheel end 44, and a key slot 46. The wheel end 44 extends through the wheel bore 206 of the wheelchair wheel 200, and is secured thereat with a main nut 47, which attaches onto the threaded portion 45 of said wheel end 44. A pair of wheel plates 48, three securing bolts 43, and a wheel key 49 facilitate attachment of the axle 42 to the wheel 200. A ball bearing 41 is provided to prevent friction between one of the wheel plates 48 and the one of the outer plates 21 against which the wheel 200 is secured.

Thus, now with reference to FIG. 3, FIG. 4, and FIG. 5 the sprocket gear 52, the axle 42 and the wheel 200 are fixed so that all three rotate together. Thus, stopping the sprocket gear 52 will stop the wheel 200 dead. This is crucial to the present invention, which locks the wheels by stopping the sprocket gear 52.

In general, the system described above is duplicated in an ordinary wheelchair installation, so that actually two braking systems are present—one for each of the two wheelchair wheels. Of course, it is possible to provide some degree of protection to the passenger by only providing one braking system, and thus only braking one of the wheels. That embodiment is not preferred, but is contemplated as being part of the inventive concept.

The manner in which the sprocket gear 52 is stopped will now be described. Reference is made casually to all drawing figures hereinafter. Reference numeral designations are maintained throughout the following discussion for clarity, although one might need to view different drawings simultaneously to understand an interaction of components as it is being described.

As previously described, the sprocket gear is mounted on one side of the outer plate assembly 21, and the axle 42 extends through the outer plate assembly 20 and inner plate assembly 10, and is attached to the wheel 200 at an opposite side of the outer plate assembly 20. However, the sprocket gear 52 can be stopped quickly by bringing the foremast teeth into contact with the gear teeth.

Once again, the inner plate assembly 10 is rigidly attached to a vertical member 150 of the wheelchair frame. Further, the wheel is supported fully by the outer plate assembly 20. The position of the outer plate assembly 20 with respect to the inner plate assembly 10 is dependent on the weight of the wheelchair and its passenger, and tension that the helical spring exerts against the inner plate bridge 12 and outer plate bridge 22. Thus, when the weight of the wheelchair is greatly reduced, such as when the passenger is not present in the wheelchair, then the helical spring expands, forcing the outer plate assembly 20 downward with respect to the inner plate assembly 10. (In actuality, the position of the outer plate assembly 20 with respect to a ground surface beneath the wheels is fixed, so the inner plate assembly 10 actually moves upward with respect to the ground surface). When the outer plate assembly 20 is forced downward, the sprocket gear 52 is moved toward the foremast assembly 60. If the outer plate assembly 20 is moved downward far enough, then the foremast teeth 64 will engage the gear teeth 54 of the sprocket gear 52, and effectively brake the wheel.

Further, when a passenger sits down in the wheelchair, the inner plate assembly 10 is pushed downward, raising the outer plate assembly 20 with respect to the inner plate assembly 10. Once the outer plate assembly 20 is raised sufficiently, the sprocket gear 52 is freed from the foremast teeth 64, and the sprocket gear 52 and thus the wheel 200 is allowed to rotate. Selection of the helical spring 36 is crucial for determining the amount of weight that the passenger must place upon the wheelchair in order to free to the sprocket gear 52. This selection is made to ensure that the foremast teeth 64 engage the sprocket gear 52 to brake the wheels when the passenger is beginning to leave or is just entering the wheelchair, and that the sprocket gear 52 is free to rotate when the passenger is fully seated in the wheelchair.

The manual release 80 operates to free the sprocket gear 52 from the foremast teeth 64, even when insufficient weight is present on the wheelchair, and thus the outer plate assembly 20 is positioned low with respect to the inner plate assembly 10. The manual release 90 operates by actually pulling the inner plate assembly 10 downward to free the foremast teeth 64 from the sprocket gear 52. The manual release lever 83 extends rearward from the housing, so that a person standing behind the wheelchair can operate the manual release to unlock the braking system.

In conclusion, herein is presented a wheelchair braking system which operates in response to weight present upon the wheelchair to selectively lock the wheels when insufficient weight is present on the wheelchair because the passenger is in the process of standing up from or sitting down in the wheelchair. A manual release is provided to unlock the wheels by a person standing behind the wheelchair, even if insufficient weight is present on the wheelchair.

What is claimed is:

1. A braking system, for mounting to a wheelchair having a wheelchair frame including a vertical frame member, and a pair of wheels, for stopping motion of the wheels when a passenger is not fully seated in the wheelchair, the braking system having a front, a rear, a top, and a bottom, and comprising:

an inner plate assembly, the inner plate assembly rigidly attached to the frame;

an axle assembly, the axle assembly including an axle which is attached to one of the wheels;

an outer plate assembly located within the housing, axle assembly mounted to the outer plate assembly such that the axle is rotatably mounted to the outer plate assembly, the outer plate assembly is pivotally attached to the inner plate assembly at the front, and the outer plate assembly capable of controlled relative vertical motion with respect to the inner plate assembly at the rear;

a sprocket, fixed to the axle assembly;

a spring between the outer plate assembly and inner plate assembly, the spring biased between the outer plate assembly and inner plate assembly near the rear, the spring moving the outer plate assembly down with respect to the inner plate assembly when a passenger is absent from the wheelchair, said spring contracting when the passenger is fully seated in the wheelchair, allowing the upper plate assembly to move upward with respect to the inner plate assembly; and a foremast assembly, mounted to the inner plate assembly, the foremast assembly including a foremast block which is selectively brought into engagement with the sprocket gear when the outer plate assembly is in a low position with respect to the inner plate assembly to stop the sprocket gear, and thus stop the wheels when the passenger is not exerting sufficient weight upon the wheelchair when the passenger is in the process of standing up or sitting down, when the passenger is fully seated in the wheelchair compression of the spring and resulting upward relative movement of the outer plate assembly frees the foremast teeth from the sprocket gear and allows the gear and the wheels to rotate.

2. The wheelchair braking system as recited in claim 1, wherein the outer plate assembly comprises a pair of outer plates which are rigidly attached to each other, wherein the inner plate assembly comprises a pair of inner plates which are rigidly attached to each other, and wherein the both inner plates are located between the outer plates.

3. The wheelchair braking system as recited in claim 2, wherein the outer plate assembly further comprises an outer plate bridge located near the bottom near the rear, the inner plate assembly further comprises an inner plate bridge located near the top near the rear, and the spring is tensioned between the inner plate bridge and outer plate bridge.

4. The wheelchair braking system as recited in claim 3, further comprising a spring guide, the outer plate bridge and inner plate bridge each having a spring guide bore, the spring guide extending through both spring guide bores, the spring extending around the spring guide between the outer plate bridge and inner plate bridge the spring guide having means on opposite ends thereof to limit relative motion of the inner plate bridge and outer plate bridge.

5. The wheelchair braking system as recited in claim 4, wherein the sprocket gear has sprocket teeth, the foremast assembly comprises a foremast arm, and the foremast arm maintains the foremast teeth in a parallel plane with the sprocket teeth.

6. The wheelchair braking system as recited in claim 5, wherein the outer plates each have an outer plate shaftway which are concentric and equal in size, the inner plates have inner plate shaftways which are oblong, the axle extends through the inner plate shaftways and outer plate shaftways, the inner plate shaftways are shaped and sized to allow the axle to extend therethrough without inhibition despite relative movement of the inner plate assembly and outer plate assembly, the size and shape of the inner plate shaftways are selected to accommodate a range of relative motion of said inner plate assembly and outer plate assembly which is allowed by the spring and spring guide.

7. The wheelchair braking system as recited in claim 6, further comprising a manual release, having a manual release lever, for allowing a person standing behind the wheelchair to selectively free the foremast from the sprocket gear by operating the manual release lever.

8. The wheelchair braking system as recited in claim 7, wherein the manual release further comprises:
- a fixed bracket, the fixed bracket attached to the outer plate bridge and extending vertically upward therefrom, the fixed bracket having a pivot point fully opposite from the outer plate bridge; and
- a lever, having a short leg and a long leg, the short leg meeting the long leg with a substantially right angle at a fulcrum, the fulcrum pivotally attached to the pivot point of the fixed bracket, the short leg attached to the inner plate assembly near the inner plate bridge, the long leg extending rearwardly and upwardly therefrom, the long leg operable to force the inner plate assembly downward with respect to the outer plate assembly to free the foremast teeth from the sprocket gear to unlock the wheels.

9. The wheelchair braking system as recited in claim 8, wherein the system as described is duplicated, so that one such braking system is associated with each of the two wheels of the wheelchair.

* * * * *